US006232733B1

(12) United States Patent
Obayashi et al.

(10) Patent No.: US 6,232,733 B1
(45) Date of Patent: May 15, 2001

(54) ENGINE-MOTOR HYBRID VEHICLE CONTROL APPARATUS AND METHOD HAVING POWER TRANSMISSION DEVICE OPERATION COMPENSATION FUNCTION

(75) Inventors: Kazuyoshi Obayashi, Chita-gun; Tsuneyuki Egami, Gamagori; Hiroya Tsuji, Yokkaichi, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/361,120

(22) Filed: Jul. 27, 1999

(30) Foreign Application Priority Data

| Jul. 28, 1998 | (JP) | ................................................ 10-212443 |
| Aug. 19, 1998 | (JP) | ................................................ 10-233176 |
| Sep. 3, 1998 | (JP) | ................................................ 10-249932 |

(51) Int. Cl.[7] .................................. H02P 9/00; H02P 5/20
(52) U.S. Cl. ........................... 318/432; 318/140; 318/139; 318/430; 475/5; 475/193; 180/65.2; 701/102; 701/110
(58) Field of Search ..................... 318/138–150; 180/65.4, 65.2; 60/705; 701/102, 110; 475/5, 193; 123/192.1

(56) References Cited

U.S. PATENT DOCUMENTS

| Re. 36,678 | * | 5/2000 | Moroto et al. ...................... 180/65.4 |
| 5,537,967 | * | 7/1996 | Tashiro et al. ..................... 123/192.1 |
| 5,621,304 | | 4/1997 | Kiuchi et al. . |
| 5,744,895 | | 4/1998 | Seguchi et al. . |
| 5,789,877 | | 8/1998 | Yamada et al. . |
| 6,007,443 | * | 12/1999 | Onimaru et al. ......................... 475/5 |
| 6,018,694 | * | 1/2000 | Egami et al. ......................... 701/102 |
| 6,020,697 | * | 2/2000 | Shimasaki et al. ................... 318/140 |
| 6,026,921 | * | 2/2000 | Aoyama et al. ..................... 180/65.2 |
| 6,057,671 | * | 5/2000 | Kuno ................................... 320/130 |
| 6,067,801 | * | 6/2000 | Harada et al. ......................... 60/705 |

FOREIGN PATENT DOCUMENTS

| 4407666 A1 | 9/1995 | (DE) . |
| 0769403 A2 | 4/1997 | (EP) . |
| 0820894 A1 | 1/1998 | (EP) . |
| 63-167640 | 7/1988 | (JP) . |
| 7-135701 | 5/1995 | (JP) . |
| 7-293267 | 11/1995 | (JP) . |
| 8-126115 | 5/1996 | (JP) . |
| 9-117012 | 5/1997 | (JP) . |
| 10-288060 | 10/1998 | (JP) . |
| 97/18101 | 5/1997 | (WO) . |

* cited by examiner

*Primary Examiner*—Paul Ip
(74) *Attorney, Agent, or Firm*—Pillsbury Winthrop LLP

(57) ABSTRACT

An engine-motor hybrid vehicle has a power transmission device including a first rotary electric machine and a second rotary electric machine. The first rotary electric machine has a first rotor connected to an engine and a second rotor connected to vehicle wheels. When the engine is in the idling condition, an electronic control apparatus controls the power transmission device to restrict engine vibrations from being transmitted to the vehicle. The electronic control apparatus controls the power transmission device based on a difference in timings of detecting a first rotor position and a second rotor position in the first rotary electric machine. The electronic control apparatus controls the power transmission device to reduce mechanical shocks which occurs immediately after engine operation starting.

14 Claims, 14 Drawing Sheets

ENGINE-MOTOR HYBRID VEHICLE CONTROL APPARATUS AND METHOD HAVING POWER TRANSMISSION DEVICE OPERATION COMPENSATION FUNCTION

CROSS REFERENCE TO RELATED APPLICATION

This application relates to and incorporates herein by reference Japanese Patent Applications No. 10-212443, No. 10-233176 and No. 10-249932 filed on Jul. 28, 1998, Aug. 19, 1998 and Sep. 3, 1998, respectively.

BACKGROUND OF THE INVENTION

1. Field of the Invention

The present invention relates to a control apparatus and method for an engine-motor hybrid vehicle, and more particularly to a control apparatus and method, which has a function of operation compensation of a power transmission device.

2. Description of Related Art

Various engine-motor hybrid vehicles having an engine, a storage battery, and a power or energy transmission device for transmitting energy among the engine, storage battery and a vehicle drive shaft are known.

When an engine is operated at an operation point within a highest operation efficiency region, that is, a large torque and low rotation speed region, the engine tends to produce periodic vibration in the idling operation region. In JP-A-9-201005, therefore, the engine is operated in a small torque and high rotation speed region, which is outside of the highest operation efficiency region, when the engine is in the idling region. This shifting of the operation point from the highest operation efficiency region to the other region will lessen the fuel consumption efficiency. In JP-A-63-167640, a periodic change is applied to an alternator output in the opposite phase relation with a periodic change in an engine.

It is also known that the power transmission device can be two rotary electric machines. In JP-A-7-135701, the rotary electric machines are controlled with respect to rotation speed and torque, respectively, to use the output torque of the engine directly as the driving power for the vehicle. In DE 4407666A1, the rotary electric machines are used to transmit the output torque of the engine electromagnetically and assist the torque, respectively. In the hybrid vehicles having those kinds of power transmission devices, controllability is lessened and audible noise is increased at the time of high speed operations or transient operations.

Further, in JP-A-9-170533, one of the two rotary electric machines is used to operate the engine at engine starting. In JP-A-9-117012, one of the two rotary electric machines is used to operate the engine after raising the engine rotation speed above the idling speed, requiring a large amount of electric power from the storage battery. In a rotation control motor and torque assist motor type power transmission device, the engine is operated at a fixed torque at the time of engine starting. Upon shifting from the fixed torque to the rotation speed control, mechanical shocks arise and are transmitted.

SUMMARY OF THE INVENTION

It is therefore an object of the present invention to provide an electronic control for an engine-motor hybrid vehicle capable of obviating the disadvantages which arise in the conventional apparatus.

According to a first aspect of the present invention, a first rotary electric machine and a second rotary electric machine are used as a power transmission device between an engine and a vehicle drive shaft. When the engine is operated in a region where engine vibration tends to occur, the engine operation point is shifted from the highest efficiency region. In addition, the first rotary electric machine is driven to apply a vibration suppressing torque. This vibration suppressing torque is changed in opposite phase relation with the periodic change in the engine torque. That is, the first rotary electric machine produces the torque which changes in the same phase relation with the periodic change in the engine torque to apply the suppressing torque as a reaction torque. The second rotary electric machine is driven to apply a periodic torque change to the vehicle drive shaft in opposite phase with that of the first rotary electric machine, so that the torque change of the first rotary electric machine applied to the vehicle drive shaft may be canceled out.

According to a second aspect of the present invention, differences in timings of detected actual rotation positions of a first rotor and a second rotor in a first rotary electric machine is used to correct a relative rotation position between the first rotor and the second rotor. The first rotary electric machine is controlled based on the corrected relative rotation position relation to improve controllability and reduce audible noise.

According to a third aspect of the present invention, a first rotary electric machine is controlled to reduce a difference between an engine rotation speed demand value and an actual engine speed demand value. A control gain is varied from a normal one for a predetermined transient period after an engine starts.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
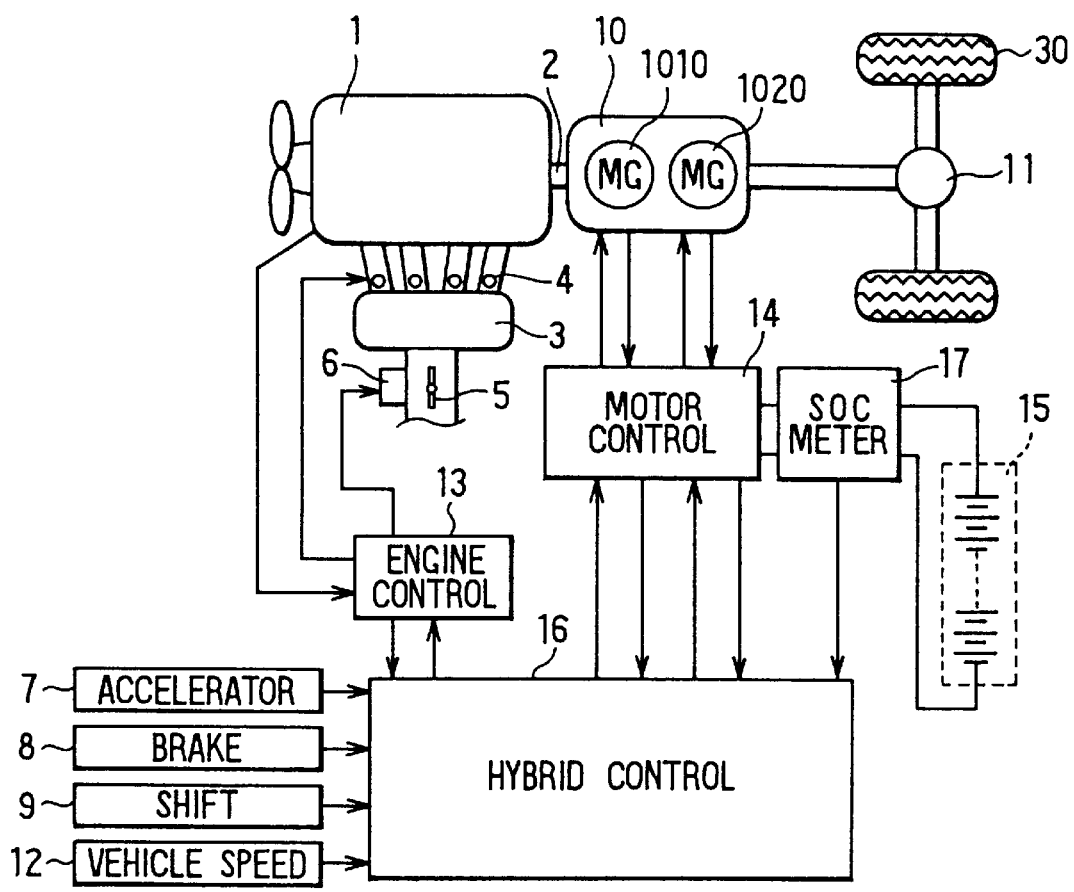
FIG. 1 is a block diagram showing an electronic control apparatus for an engine-motor hybrid vehicle according to a first embodiment of the present invention.

Preferred embodiments of an electronic control apparatus for an engine-motor hybrid vehicle will be described below with reference to accompanied drawings, in which the same or similar reference numerals designate the same or similar parts and functions throughout embodiments.

(First Embodiment)

Referring first to FIG. 1, an engine-motor hybrid vehicle has an internal combustion engine 1 having an output shaft 2, an intake pipe 3, a fuel injection valve 4, a throttle valve 5, an intake air amount adjustment device 6 such a throttle control device, an accelerator sensor 7, a brake sensor 8, a shift switch 9, a vehicle speed sensor 12 and a power transmission device 10. The power transmission device 10 includes a first rotary electric machine 1010 and a second rotary electric machine 1020.

The vehicle further has a differential gear 11, driving wheels 30, an internal combustion engine control unit 13, a motor control unit 14 for driving the first rotary electric machine 1010 and the second rotary electric machine 1020, an electricity storage device (storage battery) 15, a hybrid control unit 16, and an SOC meter 17 for measuring the state charge of the storage device 15.

Figure 2:
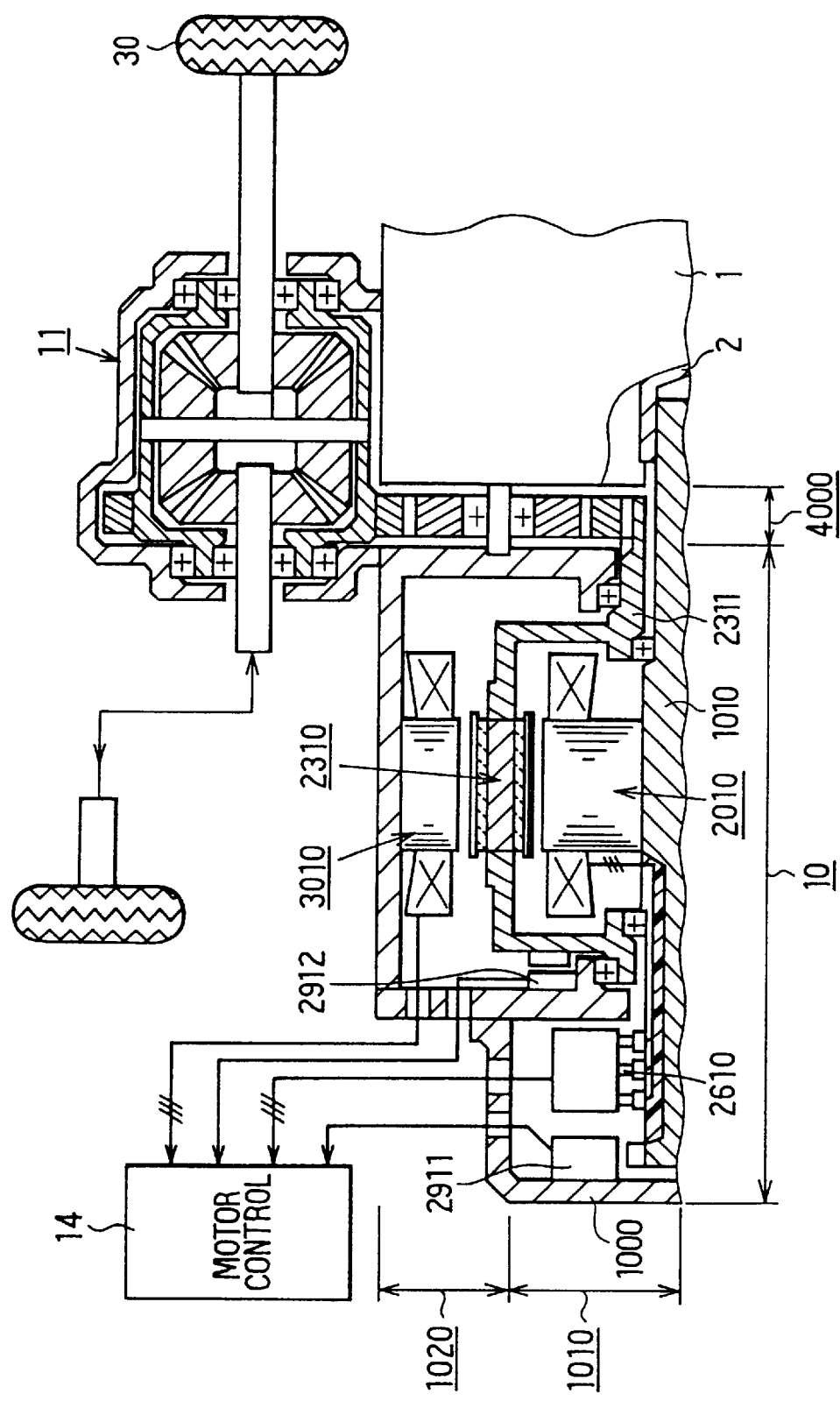
FIG. 2 is a schematic sectional view showing a power transmission device used in the first embodiment of the present invention.

As shown in FIG. 2, the first rotary electric machine 1010 is constructed as a permanent magnet type synchronous motor. It includes an input shaft 1011 held rotatably in a housing 1000 and mechanically coupled with the output shaft 2 of the internal combustion engine 1, an inner rotor (first rotor) 2010 rotatably held in the housing 1000, and an outer rotor (second rotor) 2310 facing the outer peripheral surface of the inner rotor 2010 and rotatably held in the housing 1000. The inner rotor 2010 has a three-phase armature coil, and the outer rotor 2310 has permanent magnets installed on the inner peripheral surface. The motor control unit 14 supplies a three-phase alternating voltage to the three-phase armature coil through a slip ring 2610.

The second rotary electric machine 1020 is constructed as a permanent magnet type synchronous motor/generator. It includes a stator 3010 fixed to the inner peripheral surface of the housing 1000 and facing the outer peripheral surface of the outer rotor 2310, and the outer rotor 2310 of the first rotary electric machine 1020. Permanent magnets are provided on the outer peripheral surface of the outer rotor 2310. The motor control unit 14 supplies a three-phase alternating voltage to a three-phase armature coil wound on the stator 3010. The outer rotor 2310 is coupled with the differential gear 11 through a reduction gear mechanism 4000 through an output shaft 2311.

A rotational position sensor 2911 for detecting a rotational angular position of the inner rotor 2010 is mounted in the housing 1000, and a rotational position sensor 2912 for detecting a rotational angular position of the outer rotor 2310 is provided also in the housing 1000.

The internal combustion engine control unit 13 stores a fuel consumption rate map of the internal combustion engine 1. As described later, based on a received engine power demand value Pe and the fuel consumption rate map, the internal combustion engine control unit 13 determines an engine operation point at which the internal combustion engine 1 has a maximum efficiency in performance, and determines an intake air amount (engine torque demand value) and an engine speed demand value Ne in correspondence with the determined engine operation point. Further, based on the determined intake air amount, the internal combustion engine control unit 13 controls an open degree of the throttle valve 5 and transmits the determined engine speed demand value Ne to the hybrid control unit 16. The internal combustion engine control unit 13 executes a fuel injection control by driving the electronically controlled fuel injection device 4 installed on the internal combustion engine 1 and executes a known ignition control.

Based on the torque demand values T1 for the first rotary electric machine 1010 and that T2 for the second rotary electric machine 1020 transmitted thereto from the hybrid control unit 16, the motor control unit 14 executes a control of electric currents supplied to the first and second rotary electric machines 1010 and 1020, so that the first and second rotary electric machines 1010 and 1020 generate respective torques as required by torque demand values T1 and T2. Specifically, based on the rotation speeds of the inner rotor 2010 and the outer rotor 2310 detected by the rotation position sensors 2911 and 2912 and the torque demand value T1 for the first rotary electric machine 1010, the motor control unit 14 controls the three-phase alternating current voltage supplied to the three-phase armature coil of the inner rotor 2010, so that the first rotary electric machine 1010 generates the required torque. Further, based on the rotation speed of the outer rotor 2310 detected by the rotation position sensor 2912 and the torque demand value T2 for the second rotary electric machine 1020, the motor control unit 14 controls the three-phase alternating current voltage supplied to the three-phase armature coil of the stator 3010, so that the second rotary electric machine 1010 generates the required torque.

Based on vehicle manipulation information transmitted from the accelerator sensor 7, the brake sensor 8, the shift switch 9, and the vehicle speed sensor 12, the hybrid control unit 16 calculates the engine power demand value Pe and transmits it to the internal combustion engine control unit 13. Based on the difference between the rotational angular speeds of both rotors of the first rotary electric machine 1010 transmitted thereto from the motor control unit 14, the hybrid control unit 16 controls the rotation speed of the first rotary electric machine 1010 to satisfy the received engine speed demand value Ne. That is, the hybrid control unit 16 calculates the torque demand value T1 for the first rotary electric machine 1010 and transmits it to the motor control unit 14. The hybrid control unit 16 also calculates the torque demand value T2 for the second rotary electric machine 1020 from the difference between a vehicle driving torque demand value Td and the torque demand value T1 for the first rotary electric machine 1010 and outputs it to the motor control unit 14.

Figure 3:
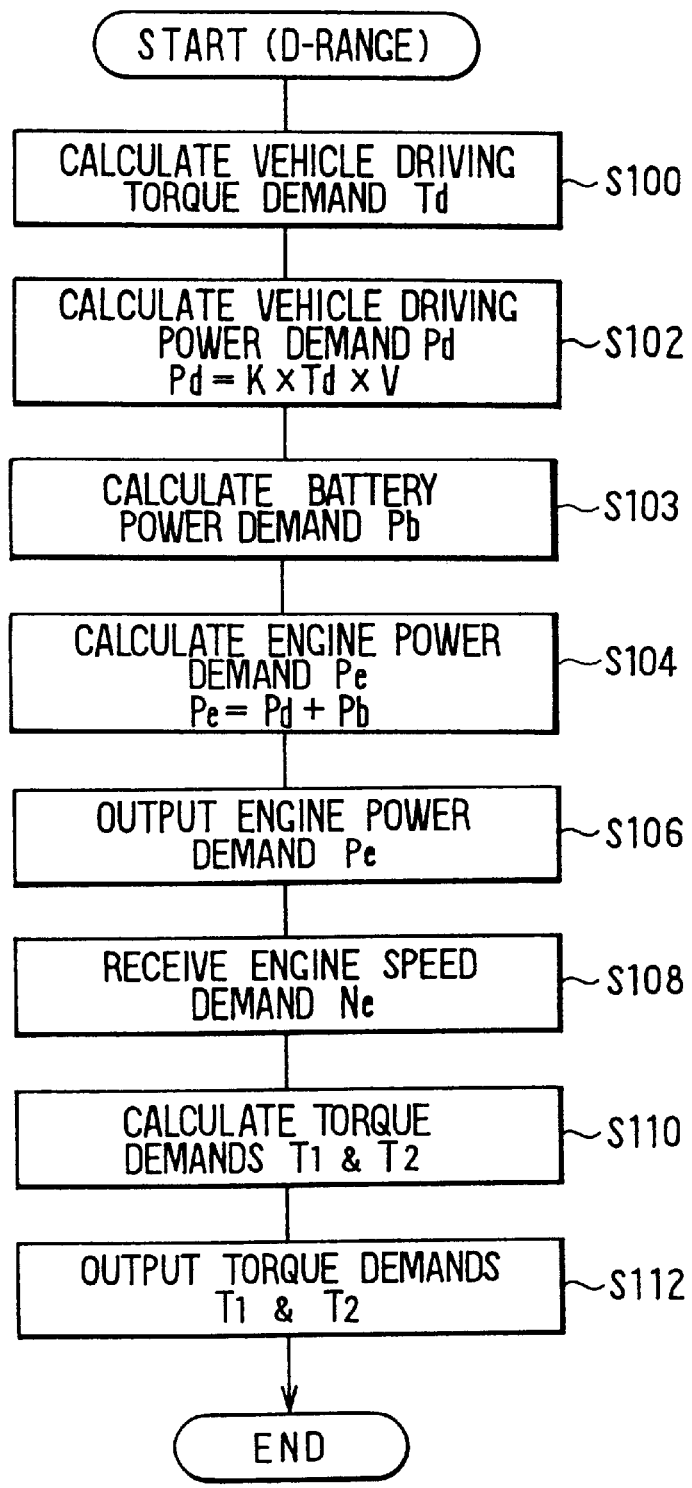
FIG. 3 is a flow diagram showing a control processing of a hybrid control unit shown in FIG. 1.

The method of controlling the internal combustion engine 1 will be described below with reference to FIGS. 3 and 4. FIG. 3 is a flow diagram to be executed by the hybrid control unit 16 when the vehicle travels in a range D. The flow diagram shows a control operation in the range from a step at which the vehicle driving torque demand value Td is calculated to a step at which the torque demand values T1 and T2 for the first rotary electric machine 1010 and the second rotary electric machine 1020 are calculated.

First, based on a depression stroke or pedal position of the accelerator transmitted to the hybrid control unit 16 from the accelerator sensor 7, at step S100, the hybrid control unit 16 calculates the vehicle driving torque demand value Td. At step S102, based on the vehicle speed (or number of rotations of the output shaft 2311 of the power transmission device 10) V transmitted to the hybrid control unit 16 from the vehicle speed sensor 12, it calculates the vehicle driving power demand value Pd. The vehicle driving power demand value Pd is calculated by K·Td·V, where K is a proportional constant.

Then, at step S103, the hybrid control unit 16 calculates a charge/discharge power demand value Pb, that is, charge/discharge power value, required by the storage device 15 based on a remaining electric capacity of the storage battery 15 detected by the SOC meter 17.

Here, the charge/discharge power demand value Pb is calculated so that the storage device 15 is held continuously to be able to charge and discharge a predetermined amount of electricity, that is, the remaining electric capacity is held within an appropriate range. More specifically, the charge/discharge power demand value Pb is set to the discharging side when the remaining electric capacity is excessively large, and the charge/discharge power demand value Pb is set to the charging side when the remaining electric capacity is excessively small. Further, even under the condition that the remaining electric capacity is within the appropriate range, the charge/discharge power demand value Pb is varied to effectuate discharging and charging to some extent while the remaining electric capacity is comparatively large and small, respectively. This charge/discharge power demand value Pb may be determined, for instance, from a data map storing the relation between the remaining electric capacity and the charge/discharge power demand value Pb.

Next, at step S104, based on the calculated vehicle driving power demand value Pd and the battery power demand value Pb, the hybrid control unit 16 calculates the engine power demand value Pe (Pe=Pd+Pb). This engine power demand value Pe is transmitted to the engine control unit 13 at step S106.

The engine control unit 13 determines the engine operation point to produce the received engine power demand value Pe at the highest engine efficiency. This engine operation point may be determined from a data map storing the relation between the engine power demand value Pe and the highest engine efficiency point. The engine control unit 13 determines the intake air flow amount based on the determined engine operation point to control the opening angle of the throttle valve 5 to attain the determined intake air flow amount. The engine rotation speed at the determined engine operation point is transmitted to the hybrid control unit 16 as the engine rotation speed demand value Ne.

The hybrid control unit 16 receives the engine rotation speed demand value Ne at step S108, and calculates at step S110 the torque demand values T1 and T2 of the first rotary electric machine 1010 and the second rotary electric machine 1020. Those calculated torque demand values T1 and T2 are transmitted to the motor control unit 14 at step S112.

Figure 4:
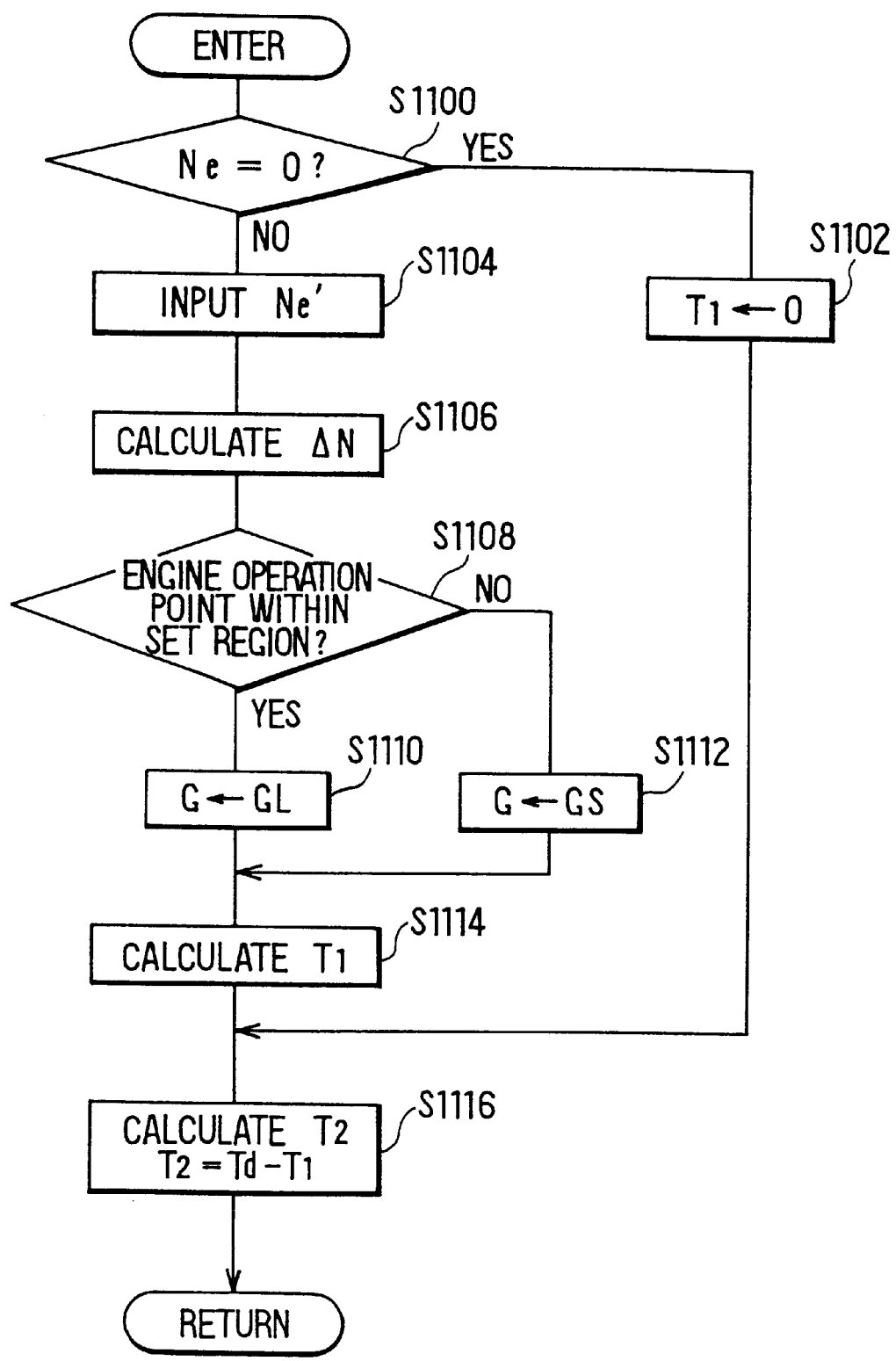
FIG. 4 is a flow diagram showing a calculation processing of an engine power demand value shown in FIG. 3.

The hybrid control unit 16 also executes a roughness control at step S110 to reduce vibrations of the internal combustion engine 1 as shown in FIG. 4. This roughness control may be executed in the motor control unit 14.

As shown in FIG. 4, the control unit 16 checks first at step S1100 whether the received engine rotation speed demand value Ne is zero (0). If YES (Ne=0), the torque demand value T1 for the first rotary electric machine 1010 is set to zero at step S1102 and the torque demand value T2 for the second rotary electric machine 1020 is calculated at step S1116. If NO (Ne≠0), the actual engine rotation speed Ne' detected by the rotation position sensor 2911 is read in at step S1104, and the speed difference ΔN between the engine rotation speed demand value Ne and the actual rotation speed Ne', that is, ΔN=Ne'−Ne is calculated at step S1106.

Next, it is checked at step S1108 whether the engine operation point is within a set region, for instance, an engine idling region, in which the engine torque is small and the engine rotation speed is low and engine vibration increases. If YES (inside the set region) at step S1108, a control gain G in a feedback control of the first rotary electric machine 1010 is set to a large gain GL at step S1110. If NO (outside set region) at step S1108, the first rotary electric machine feedback control gain G is set to a small gain GS at step S1112.

Then, at step S1114, the torque demand value T1 which the first rotary electric machine 1010 is required to produce is calculated at step S1114 as follows.

$$T1 = T1o + \Delta T1 = T1o + (G+k)\cdot \Delta N - G\cdot \Delta No$$

wherein T1o is a previous value of the torque demand value T1, k is a constant and ΔNo is a previous value of the speed difference ΔN.

Thus, the torque demand value T1 is increased as the actual engine rotation speed Ne' increases above the engine rotation speed demand value Ne, so that the torque of the first rotary electric machine 1010 is increased. As a result, the torque transmitted from the first rotor 2010 to the second rotor 2310 increases to reduce the actual engine rotation speed Ne' toward the engine rotation speed demand value Ne. On the contrary, the torque demand value T1 is decreased as the actual engine rotation speed Ne' decreases below the engine rotation speed demand value Ne, so that the torque of the first rotary electric machine 1010 is decreased. As a result, the torque transmitted from the first rotor 2010 to the second rotor 2310 decreases to increase the actual engine rotation speed Ne' toward the engine rotation speed demand value Ne. In this way, the actual engine rotation speed Ne' converges to the engine rotation speed demand value Ne by the feedback-control of the torque of the first rotary electric machine.

It is to be noted that the gain GL is set larger than the gain GS, so that the effect of engine roughness control is enhanced as long as the engine operation point is within the set region such as the engine idling region where engine vibration tends to increase.

More specifically, when the internal combustion engine 1 changes its torque periodically in timed relation with engine operation strokes, the actual engine rotation speed Ne' detected at step S1104 changes responsively resulting in a periodic change in the difference ΔN calculated at step S1106.

Therefore, in the engine operation region where the engine vibration increases due to the periodic change in the engine torque, the control gain G multiplied on the difference ΔN which includes the periodic change in the engine rotation speed is set larger to GL than that in the other engine operation region. The torque of the first rotary electric machine 1010 is feedback-controlled with this large control gain GL. As a result, the engine vibration can be reduced by suppressing the change in the engine rotation speed in the operation region where the engine vibration increases.

That is, even when the internal combustion engine 1 is operated at the operation point where the engine vibration increases, the engine can be operated without increasing the engine vibration. Thus, fuel consumption efficiency of the internal combustion engine 1 can be improved.

After the determination of the torque demand value T1 for the first rotary electric machine 1010 at step S114, the torque demand value T2 which the second rotary electric machine 1020 is required to produce is calculated at step S1116 by subtracting the torque demand value T1 from the vehicle driving torque demand value Td. Then, the hybrid control unit 16 transmits the calculated torque demand values T1 and T2 to the motor control unit 14 at step S112 (FIG. 3).

When the control gain G is increased in the engine operation region where the engine vibration is large to suppress the engine vibration, the periodic change in the torque which the first rotary electric machine 1010 applies to the output shaft 2311 increases. This torque applied from the second rotary electric machine 1020 to the output shaft 2311 is phased opposite and equaled to the periodic change in the torque applied to the output shaft 2311 from the first rotary electric machine 1010. Therefore, the vehicle driveability is not lessened due to change in the vehicle driving torque.

Figure 5:
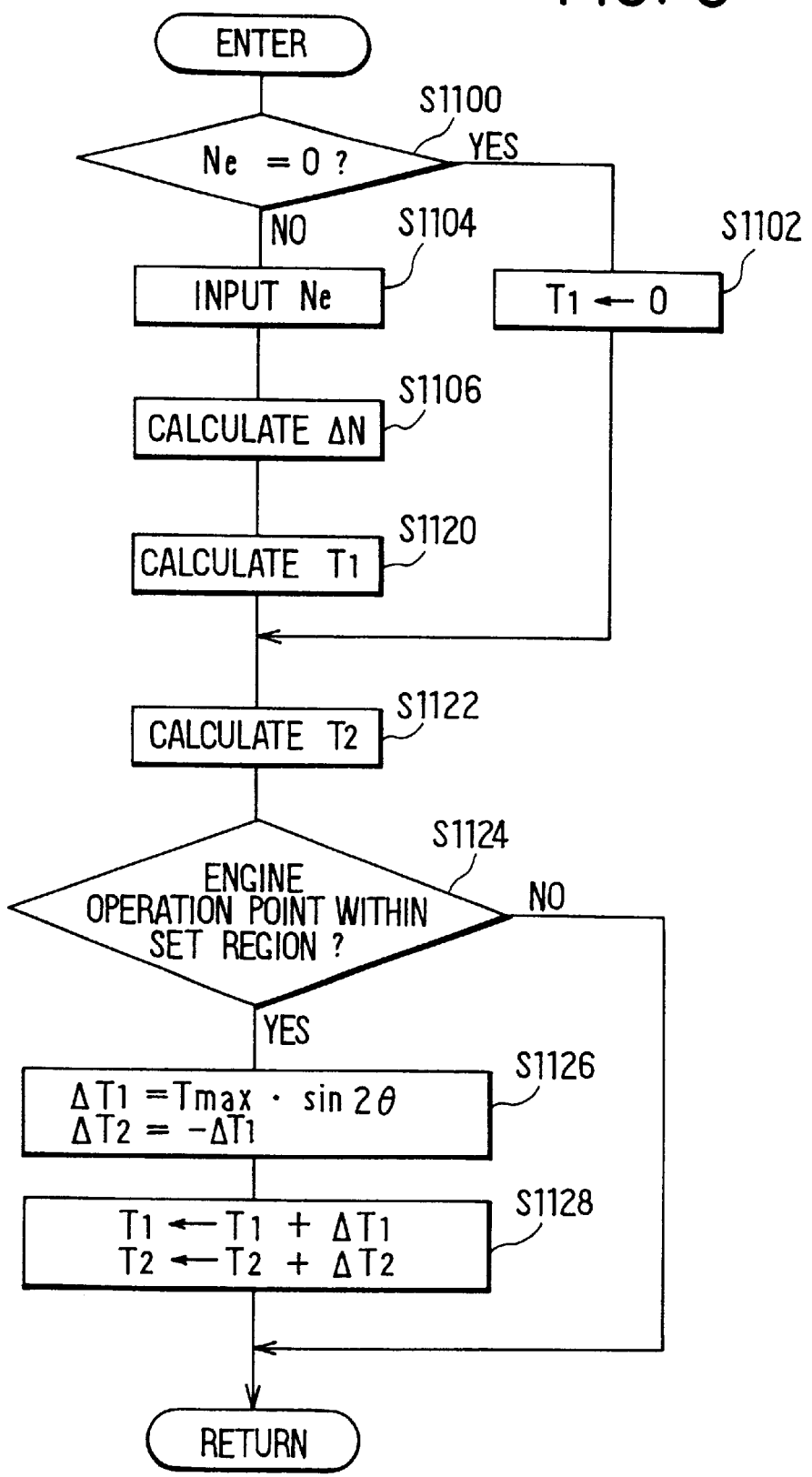
FIG. 5 is a flow diagram showing a calculation processing of an engine power demand value according to a modification of the first embodiment.

The above first embodiment may be modified as shown in FIG. 5, which is differentiated from FIG. 4 in steps S1120 to S1128. That is, at step S1120 following step S1106, the torque demand value T1 which the first rotary electric machine 1010 is required to produce is calculated as follows.

$$T1=T1o+\Delta T1=T1o+(G+k)\cdot \Delta N-f(G\cdot \Delta No)$$

wherein T1o is a previous value of the torque demand value T1 and f(G·ΔNo) is a function of a product of the gain G and the rotation speed difference ΔNo. Thus, as described before, the actual engine rotation speed Ne is feedback-controlled to the engine rotation speed demand value Ne.

Next, at step S1122, the torque demand value T2 required for the second rotary electric machine 1020 to produce is calculated by subtracting the torque demand value T1 from the vehicle driving torque demand Td. It is then checked at step S1124 whether the engine operation point is within the set region such as the engine idling condition, that is, small torque and low rotation speed region, where the engine vibration increases. If YES (inside the set region) at step S1124, a torque change amount ΔT1 to be added to the torque demand value T1 for restricting the periodic change component in the engine torque is calculated as ΔT1= Tmax·sin θ at step S1126. Further, a torque change amount ΔT2(ΔT2=−ΔT1) is also calculated to cancel out the influence caused to the output shaft 2311 by the torque change amount ΔT1.

The maximum value of the periodic change component in the engine torque value Tmax is a function of the engine rotation speed and the engine torque, and may be determined from a data map. This maximum torque value Tmax is multiplied by the sine value of a crank angle position (rotation position of the first rotor 2010)θ, and the resulting value is set as the present value of the maximum value Tmax of the periodic change component of the engine torque. It is to be understood that the sine value sin 3θ is used in the case of six-cylinder engines, although sine 2θ is used in this modification in view of two explosions of mixture in one rotation of the crankshaft in the case of four-cylinder engines. Further, although the periodic change component in the engine torque is represented as the sine wave, it may be represented as a sum of each harmonic component when the periodic change component should be represented by a more complicated wave.

Finally, at step S1128, the torque change amounts ΔT1 and ΔT2 calculated at step S1126 are added to the torque demand values T1 and T2 calculated at steps S1120 and S1122, respectively, so that the resultant torque demand values T1 and T2 are used as the current torque values.

According to this modification, in the same manner as in the first embodiment, the engine vibration can be reduced while operating the internal combustion engine 1 at the engine operation point where the fuel consumption efficiency is high and while not lessening the vehicle driveability, even when the internal combustion engine 1 is in the operation region where the engine vibration increases.

(Second Embodiment)

The second embodiment is constructed in the similar manner as in the first embodiment and generally operates in the similar manner as in the first embodiment. However, in this embodiment, the power transmission device 10 is controlled by the motor control unit as follows.

Figure 6:
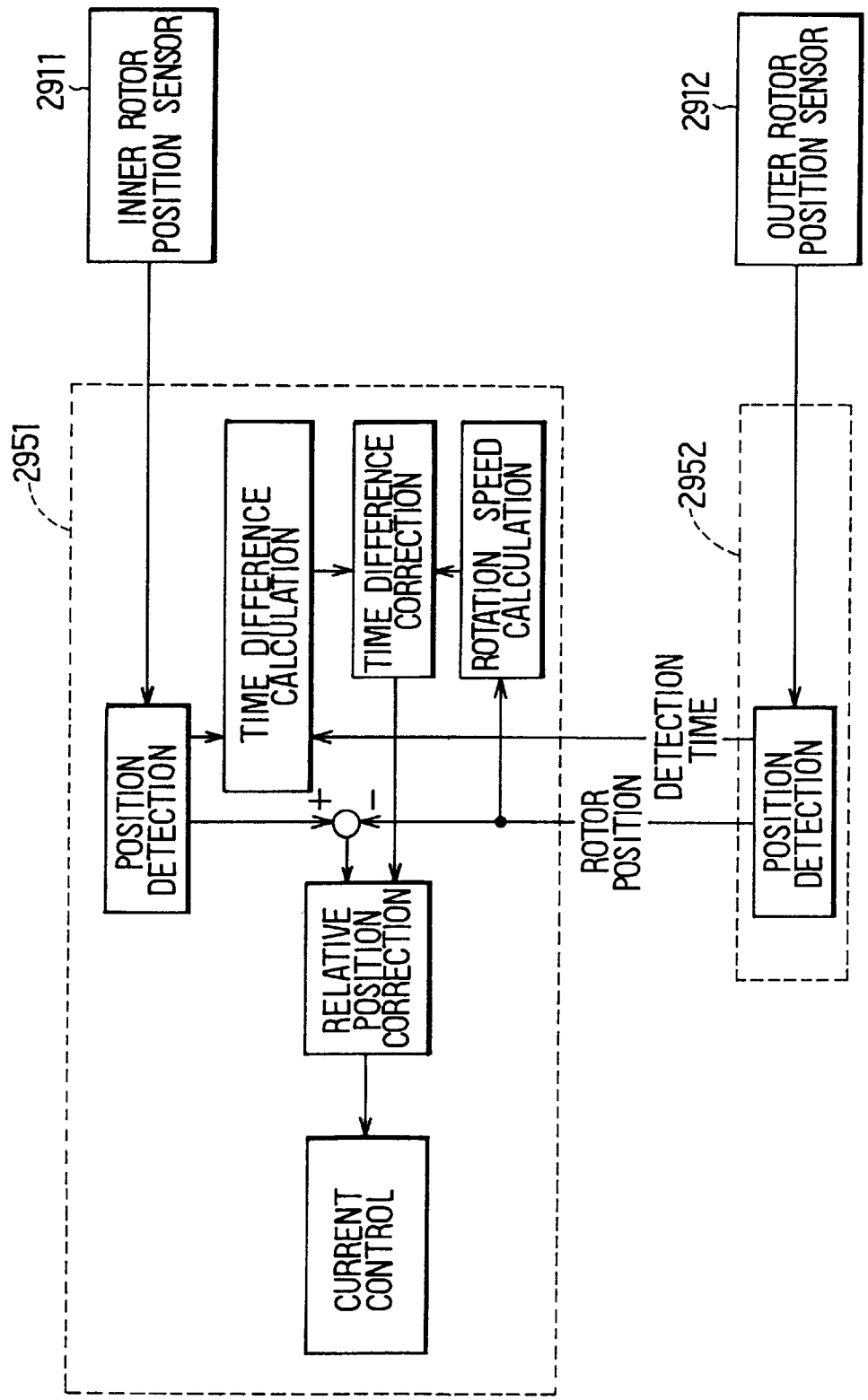
FIG. 6 is a functional block diagram showing a motor control unit used in a second embodiment of the present invention.

In this embodiment, as shown in FIG. 6, the motor control unit 14 has two microcomputers 2951 and 2952, which primarily control the first rotary electric machine 1010 and the second rotary electric machine 1020 of the power transmission device 10, respectively. Further, the microcomputers 2951 and 2952 are connected to the inner rotor rotation position sensor 2911 and the outer rotor rotation position sensor 2912, respectively.

Figure 7:
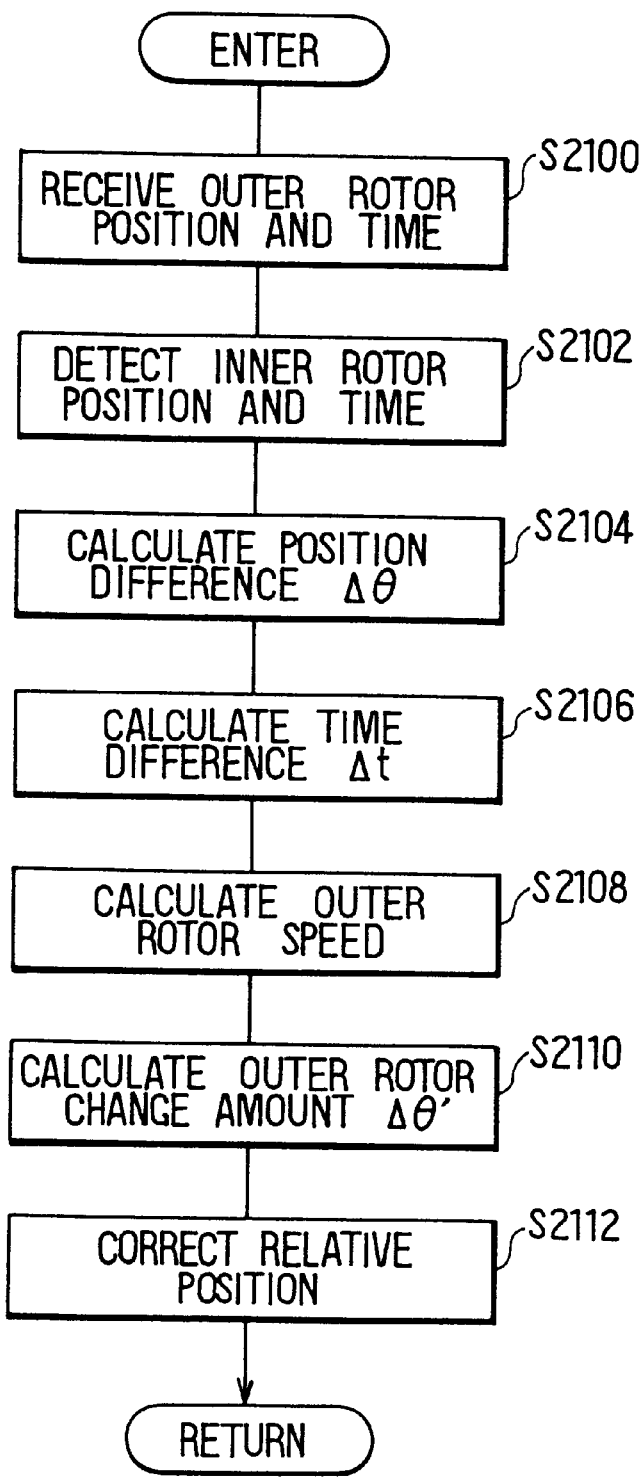
FIG. 7 is a flow diagram showing a calculation processing of the motor control unit in the second embodiment.

Further, the motor control unit 14, particularly the microcomputer 2951 is programmed to operate as shown in FIG. 7. It is assumed here that the microcomputer 2952 detects the outer rotor position from the output signal of the outer rotor position sensor 2912 and transmits it to the microcomputer 2951 along with the timing signal indicative of the time of detection of the outer rotor position signal.

In the microcomputer 2951, the detected outer rotor position and its detection time are received at step S2100, and the inner rotor rotation position is detected from the output signal of the inner rotor position sensor 2911 at step S2102 along with its detection time. A difference in the positions Δθ between the inner rotor 2010 and the outer rotor 2310 is calculated provisionally at step S2104. Then, at step S2106, a difference in the times Δt between the detection times of the two rotor positions is calculated.

A change rate of the rotation position of the outer rotor 2310 is calculated at step S2108, thus calculating the rotation speed of the outer rotor 2310. Further, at step S2110, a position change amount Δθ' in a period of the time difference Δt is calculated by multiplying Δθ' and Δt. Finally, at step S2112, the actual rotation position difference (relative rotation positions) Δθ real of the inner rotor 2010 and the outer rotor 2310 is calculated or corrected by adding the rotation position difference Δθ calculated provisionally at step S2104 and the position change amount Δθ'. Thus, the microcomputer 2915 can control the first rotary electric machine 1010, by controlling the three-phase alternating current voltage even under the condition that the rotation speed changes rapidly.

Figure 8:
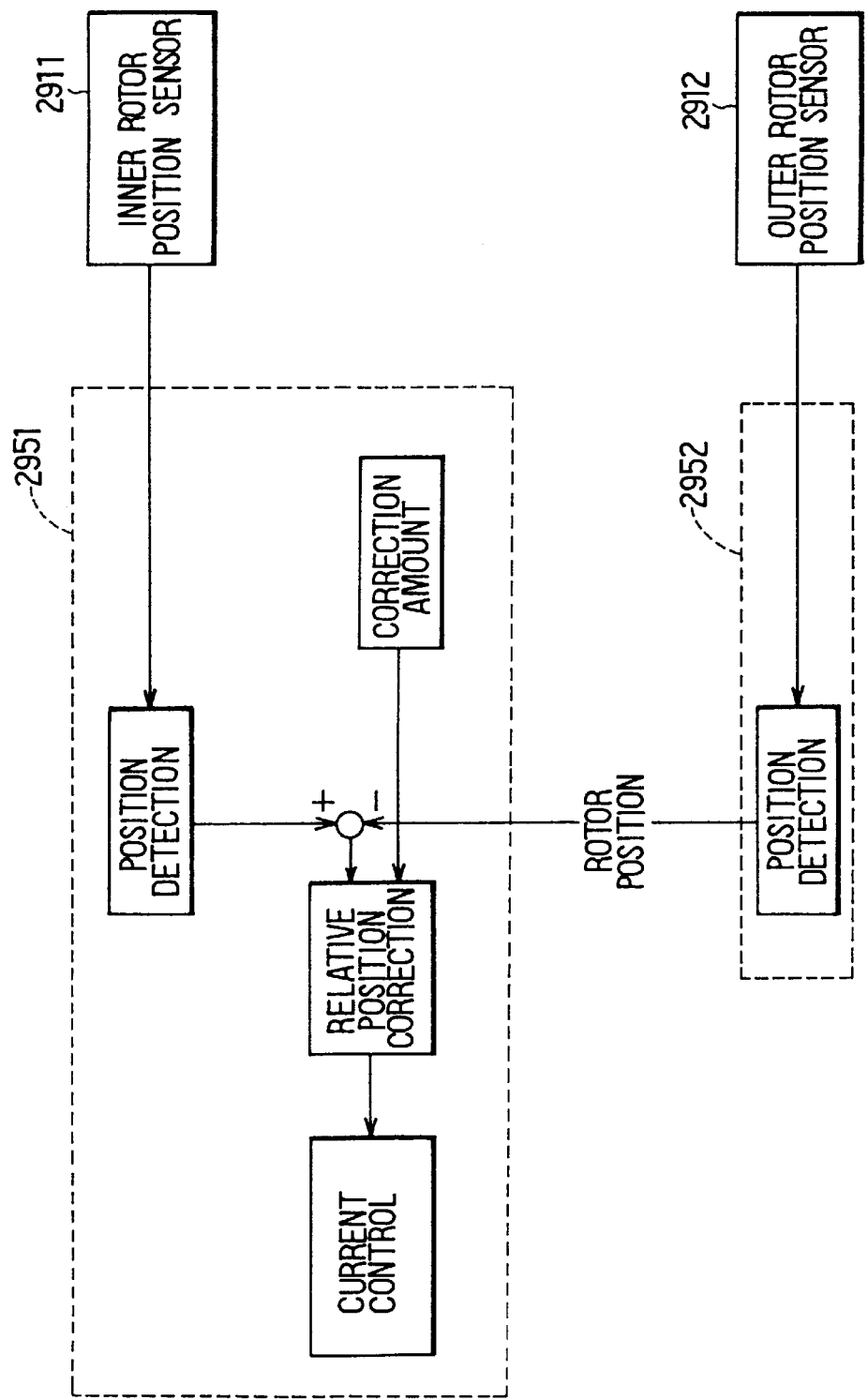
FIG. 8 is a functional block diagram showing a motor control unit used in a modification of the second embodiment of the present invention.
Figure 9:
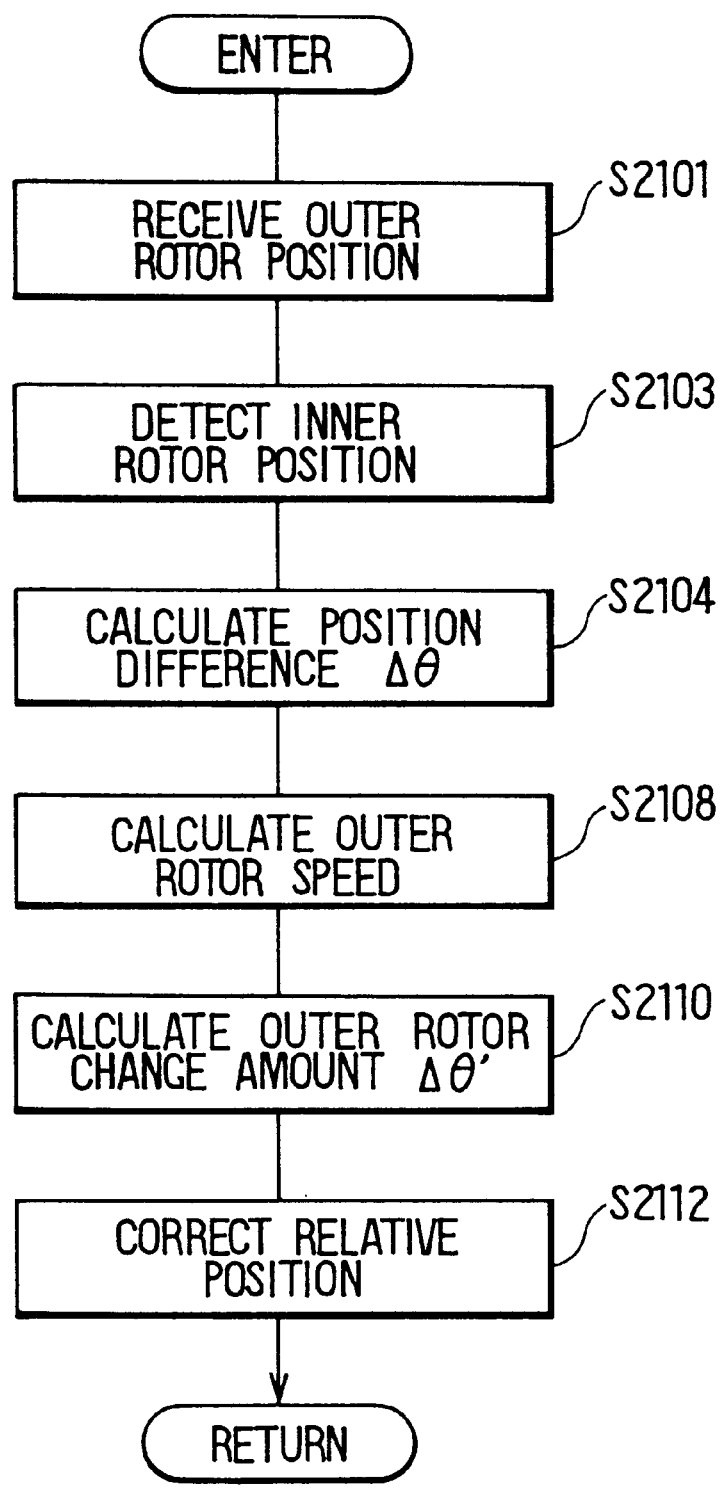
FIG. 9 is a flow diagram showing a calculation processing of the motor control unit in the modification of the second embodiment.

The above second embodiment may be modified as shown in FIGS. 8 and 9, in which the relative position correction is attained without using the time difference Δt. It is assumed in this modification that the difference in timings of detecting the rotation positions of the inner rotor 2010 and the outer rotor 2310 do not change so much, and a fixed time difference stored in a memory is used.

More specifically, in the microcomputer 2951, only the rotation position of the outer rotor 2310 detected by the microcomputer 2952 is received at step S2101 and only the rotation position of the inner rotor 2010 is detected at step S2103. After the calculations of the provisional position difference Δθ' at step S2104 and of the outer rotor rotation speed at step S2108, the outer rotor position change amount Δθ' is calculated by multiplying the outer rotor rotation speed and the fixed time difference. Finally, at step S2112, the relative position of the outer rotor 2310 relative to the inner rotor 2010 is corrected.

Further, the second embodiment may be modified in that, as disclosed in JP-A-9-42122, the power transmission device 10 is constructed by two non-coaxial rotary electric machines in which the second rotary electric machine has a third rotor mechanically coupled with the second rotor 2310. Still further, a rotation speed conversion mechanism may be provided between the internal combustion engine 1 and the first rotor 2010.

(Third Embodiment)

Figure 10:
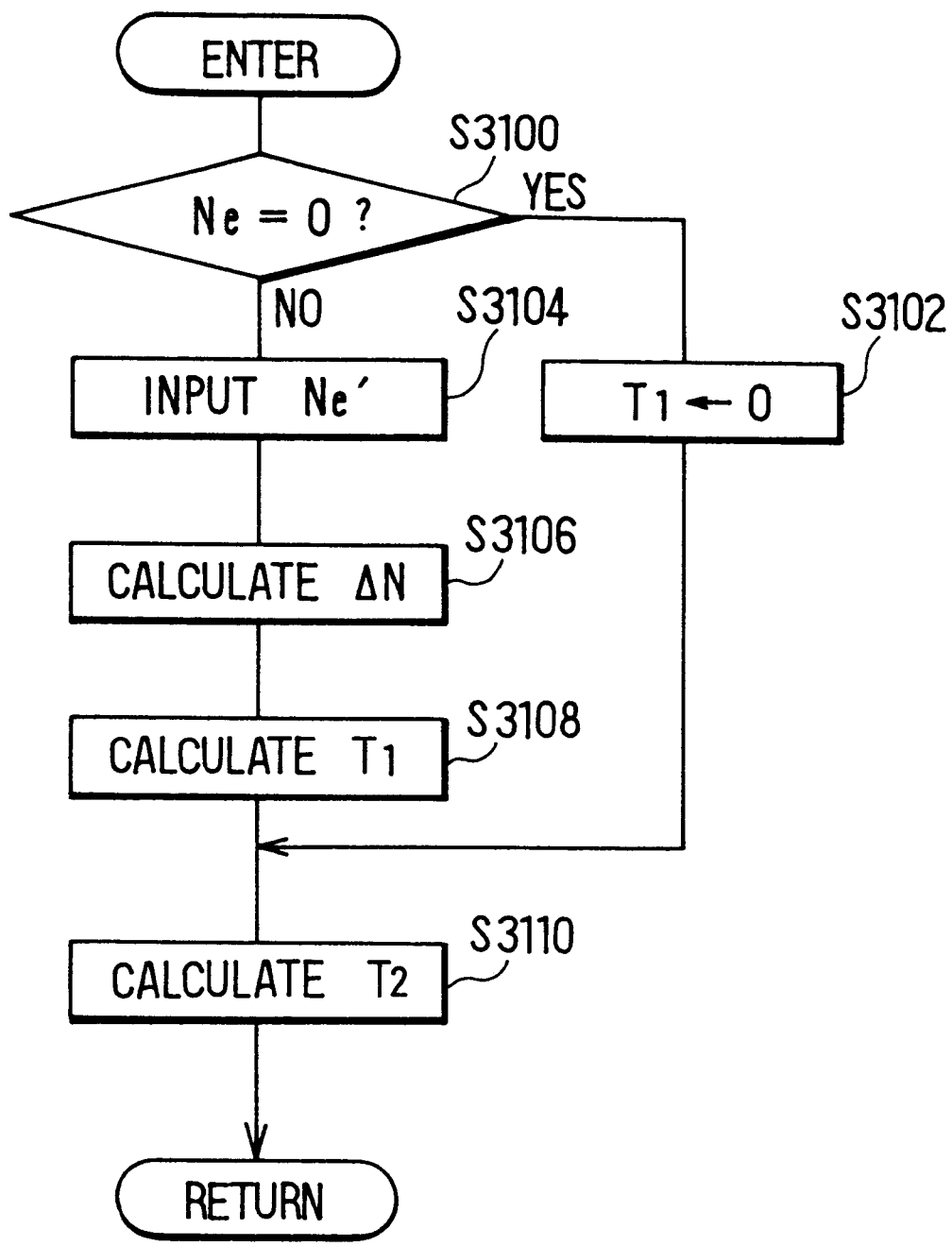
FIG. 10 is a flow diagram showing a calculation processing of the hybrid control unit used in a third embodiment of the present invention.
Figure 11:
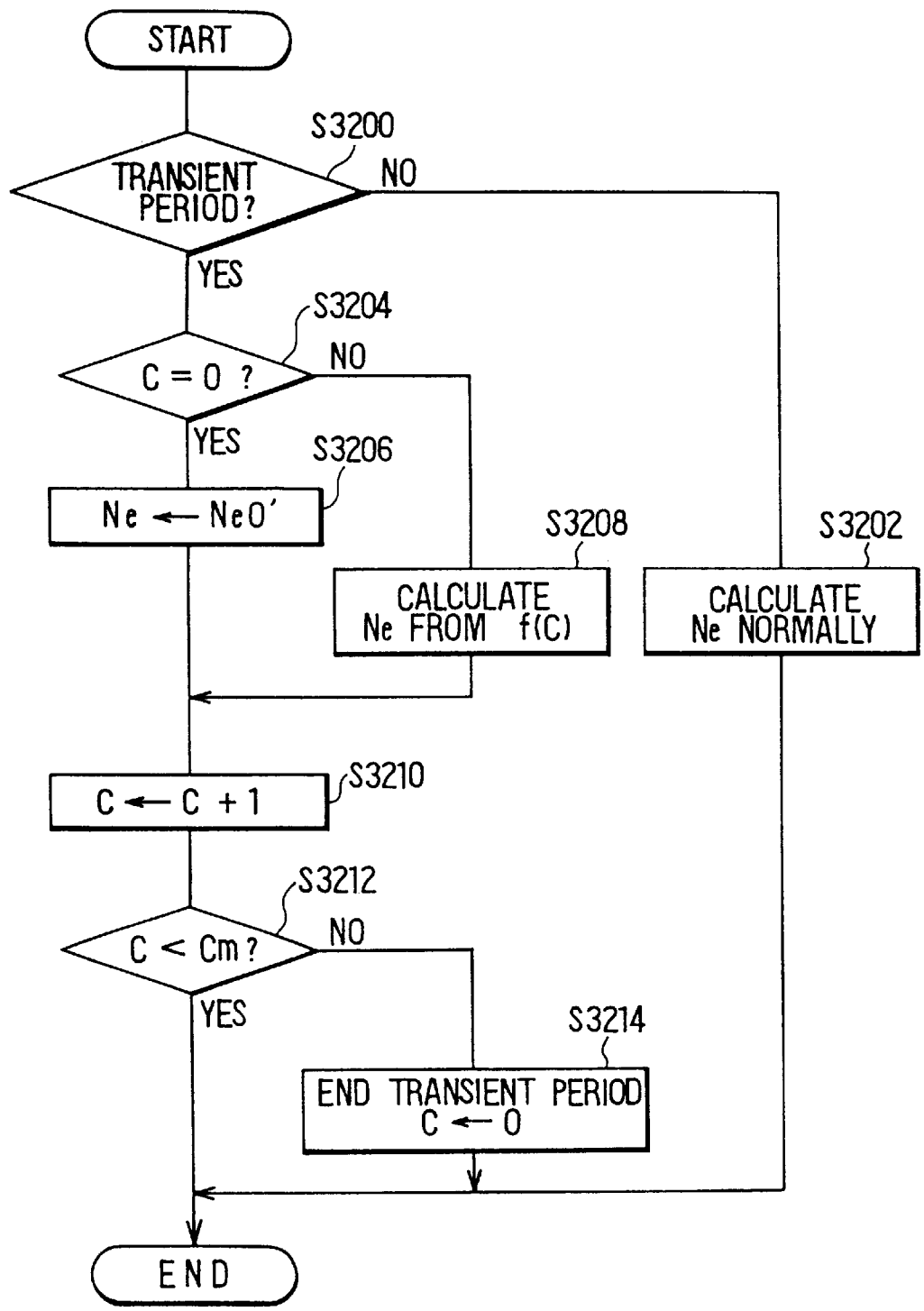
FIG. 11 is a flow diagram showing a rotation speed control processing of the hybrid control unit used in the third embodiment.
Figure 12:
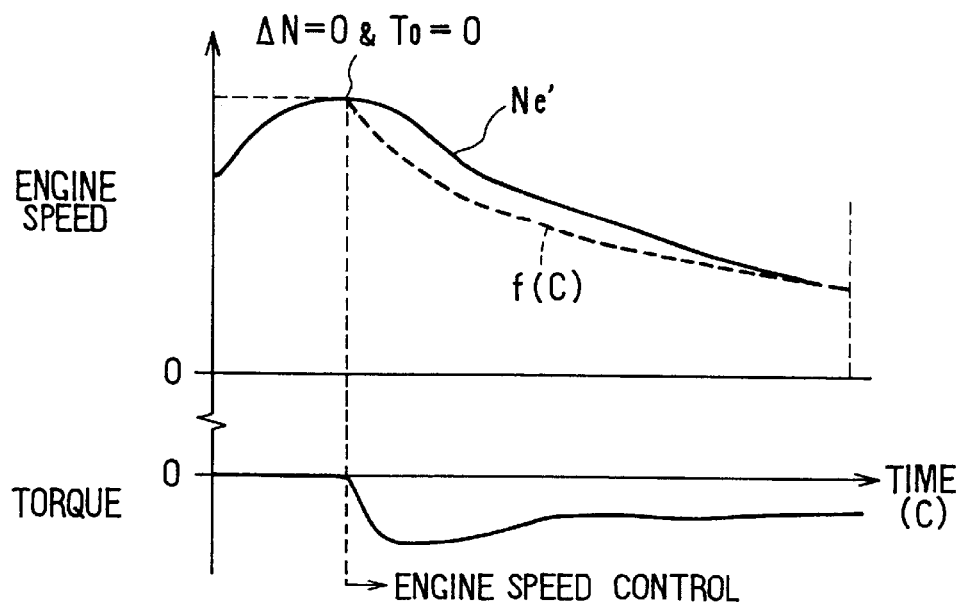
FIG. 12 is a timing diagram showing speed changes of an engine and torque changes of a first rotary electric machine in the third embodiment.

The third embodiment is constructed in the similar manner as in the first embodiment (FIGS. 1 and 2) and generally operates in the similar manner as in the first embodiment (FIG. 3). However, in this embodiment, power transmission device 10 is controlled differently as shown in FIGS. 10 and 11 to reduce mechanical shocks which occurs immediately after the engine operation starting. The flow diagram of FIG. 10 is executed by the hybrid control unit 16 in place of step S110 of FIG. 3 (steps S1110–S1116 of FIG. 4).

As shown in FIG. 10, the hybrid control unit 16 checks first at step S3100 whether the received engine rotation speed demand value Ne is zero (0). If YES (Ne=0), the torque demand value T1 for the first rotary electric machine 1010 is set to zero at step S3102 and the torque demand value T2 for the second rotary electric machine 1020 is calculated at step S3110. If NO (Ne≠0), the actual engine rotation speed Ne' detected by the rotation position sensor 2911 is read in at step S3104, and the speed difference ΔN between the engine rotation speed demand value Ne and the actual rotation speed Ne', that is, ΔN=Ne'–Ne, is calculated at step S3106.

Then, at step S3108, the torque demand value T1 which the first rotary electric machine 1010 is required to produce is calculated based on the speed difference ΔN as follows.

$$T1=T1o+\Delta T1=T1o+f(G\cdot\Delta N)$$

wherein T1o is a previous value of the torque demand value T1, f(G·ΔN) is a function of product of a first rotary electric machine feedback control gain and the speed difference ΔN. In this embodiment, the torque demand value T1 may be calculated as follows for simplification.

$$T1=T1o+G\cdot\Delta N=T1o+G\cdot(Ne'-Ne),$$

or $$T1=T1o+G\cdot(\Delta N+K),$$

with K being a constant.

Thus, the torque demand value T1 is increased as the actual engine rotation speed Ne' increases above the engine rotation speed demand value Ne, so that the torque of the first rotary electric machine 1010 is increased. As a result, the torque transmitted from the first rotor 2010 to the second rotor 2310 increases to reduce the actual engine rotation speed Ne' toward the engine rotation speed demand value Ne. On the contrary, the torque demand value Ti is decreased as the actual engine rotation speed Ne' decreases below the engine rotation speed demand value Ne, so that the torque of the first rotary electric machine 1010 is decreased. As a result, the torque transmitted from the first rotor 2010 to the second rotor 2310 decreases to increase the actual engine rotation speed Ne' toward the engine rotation speed demand value Ne. In this way, the actual engine rotation speed Ne' converges to the engine rotation speed demand value Ne by the torque feedback control for the first rotary electric machine 1010.

After the determination of the torque demand value T1 for the first rotary electricmachine 1010 at step S3108, the torque demand value T2 which the second rotary electric machine 1020 is required to produce is calculated at step S3110 by subtracting the torque demand value T1 from the vehicle driving torque demand value Td. Then, the hybrid control unit 16 transmits the calculated torque demand values T1 and T2 to the motor control unit 14 (step S112 in FIG. 3).

Next, an engine rotation speed control routine is described with reference to FIG. 11. This processing is executed by the hybrid control unit 16 at every predetermined time interruption only for a transient period immediately after the starting of engine operation (fuel and ignition spark supply). Here, the transient period is defined as a period starting after a complete mixture combustion in the internal combustion engine and ending after the engine rotation speed rises with overshooting. This control may be executed by the engine control unit 13.

It is first checked at step S3200 whether it is within a predetermined transient period from the engine operation starting. This may be checked with reference to the engine rotation speed Ne', that is, whether Ne' is low. If NO (Ne' is high), the engine rotation speed demand value Ne is calculated normally at step S3202. That is, as described with reference to the first embodiment, the engine rotation speed demand value Ne is calculated from the engine power demand value Pe and the fuel consumption rate map to provide the highest operation efficiency of the internal combustion engine 1.

If YES at step S3200, it is checked at step S3204 whether the counter value C of a timer counter measuring the transient period is zero (0) indicative of the start of the transient period. If YES, the previous actual rotation speed Neo' is set as the engine rotation speed demand value Ne at step S3206. If NO, the engine rotation speed demand value Ne is calculated from a mathematical function f(C) of the counter value C at step S3208. Here, this mathematical function f(C) is defined as a monotonic function the change rate of which decreases monotonically as shown by the dotted line in FIG. 6. The mathematical function f(C) is determined to correspond to Neo initially and to Ne at the end of the transient period Cm. This engine rotation speed demand value Ne may be determined from a data map in place of the mathematical function f(C).

Next, the counter value C is incremented at step S3210, and it is determined at step S3212 whether the counter value C is less than Cm. If YES indicating that it is still in the transient period, the routine ends and returns to the main routine (FIG. 3). If No indicating that the transient period is over, the counter value C is reset to zero at step S3214.

According to the above engine rotation speed control, as shown in FIG. 11, the rotary electric machine torque T is decreased (torque demand value T1 for the first rotary electric machine 1010 is increased) gradually at the initial stage of the transient period and is increased (torque demand value T1 is decreased) gradually thereafter. As a result, the mechanical shock to the internal combustion engine 1 can be reduced without using a shock absorbing mechanism such as a mechanical damper. Although the torque control for the first rotary electric machine 1010 is carried out by changing the engine rotation speed demand value Ne in the above engine speed control, the same operation may be attained by changing the difference ΔN(ΔN=Ne'−Ne) between the actual engine rotation speed Ne' and the engine rotation speed demand value Ne.

Figure 13:
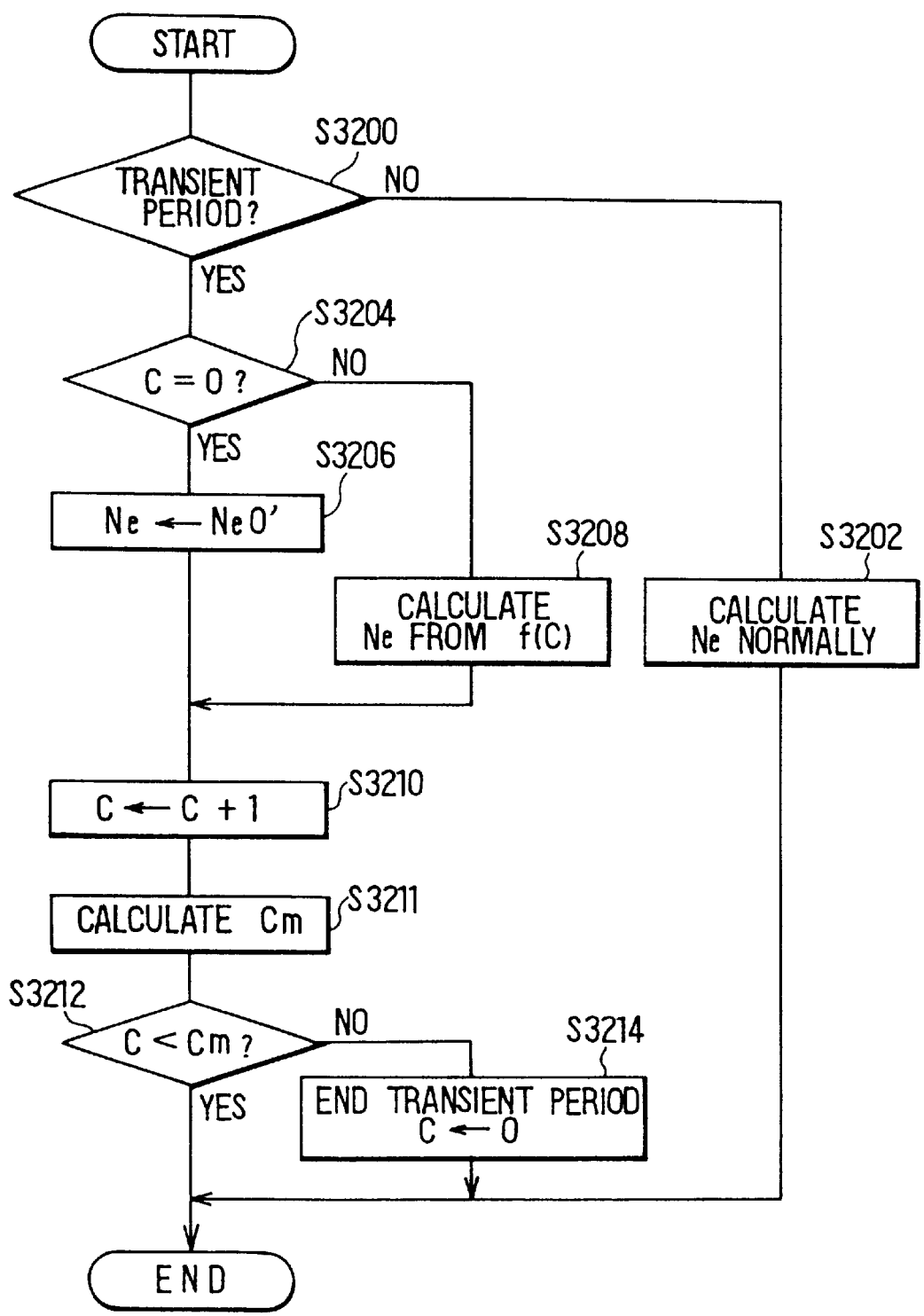
FIG. 13 is a flow diagram showing a rotation speed control processing of the hybrid control unit used in a modification the third embodiment.

As a modification of the above third embodiment, the engine rotation speed control may be attained as shown in FIG. 13. In this modification, step S3211 is added between steps S3210 and S3212, so that the transient period may be set variably. That is, the transient period Cm is calculated by multiplying a constant and the speed difference (ΔN=Neo'−Ne). Thus, the rotation speed control is terminated and returned to the normal control at the earlier time, as the speed difference ΔN is smaller.

Figure 14:
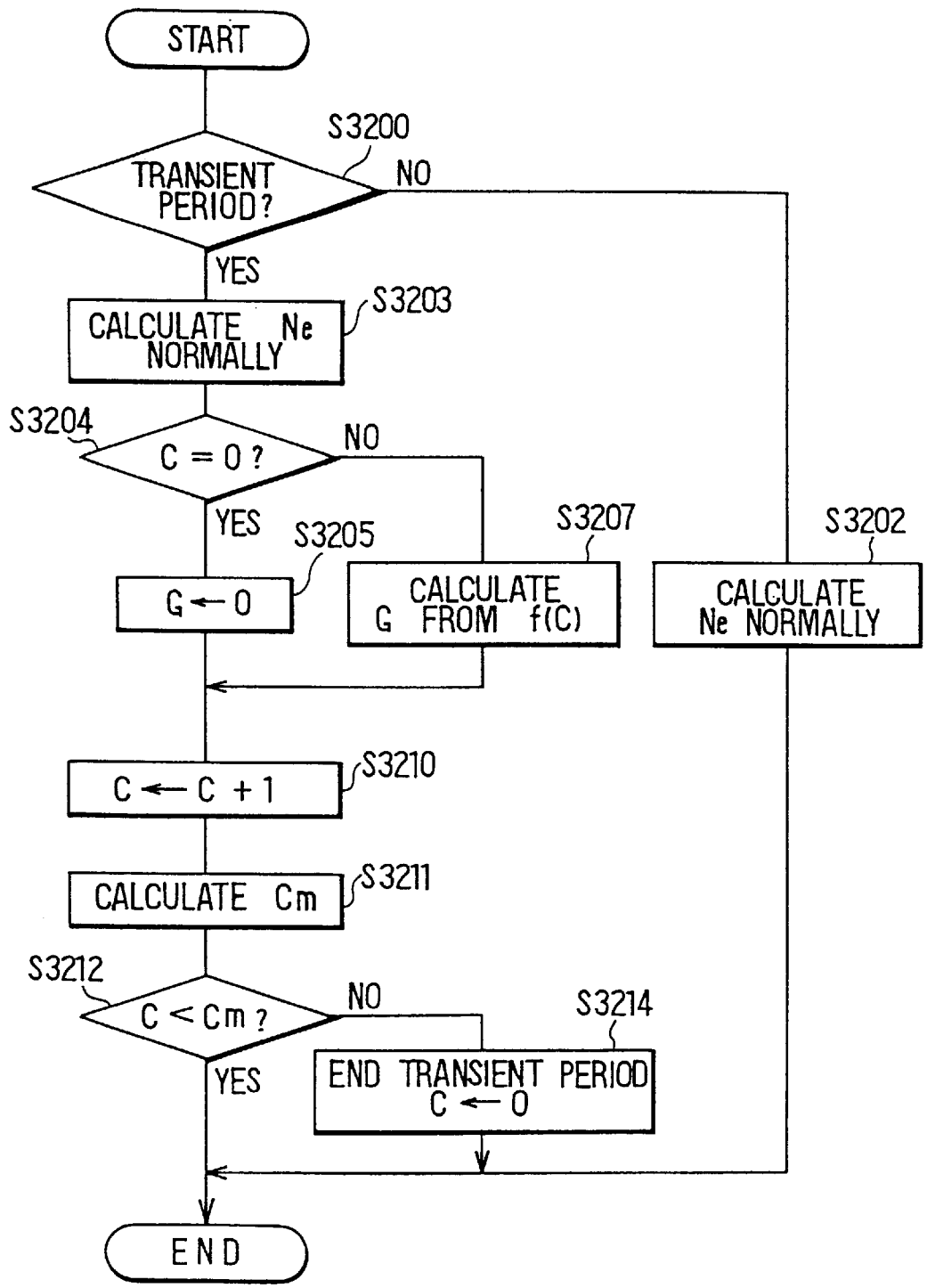
FIG. 14 is a flow diagram showing a rotation speed control processing of the hybrid control unit used in another modification the third embodiment.

As another modification, the engine speed rotation control may be attained as shown in FIG. 14. In this modification, the engine rotation speed demand value Ne is not changed but the constant (control gain G) to be multiplied to the speed difference ΔN is changed.

Figure 15:
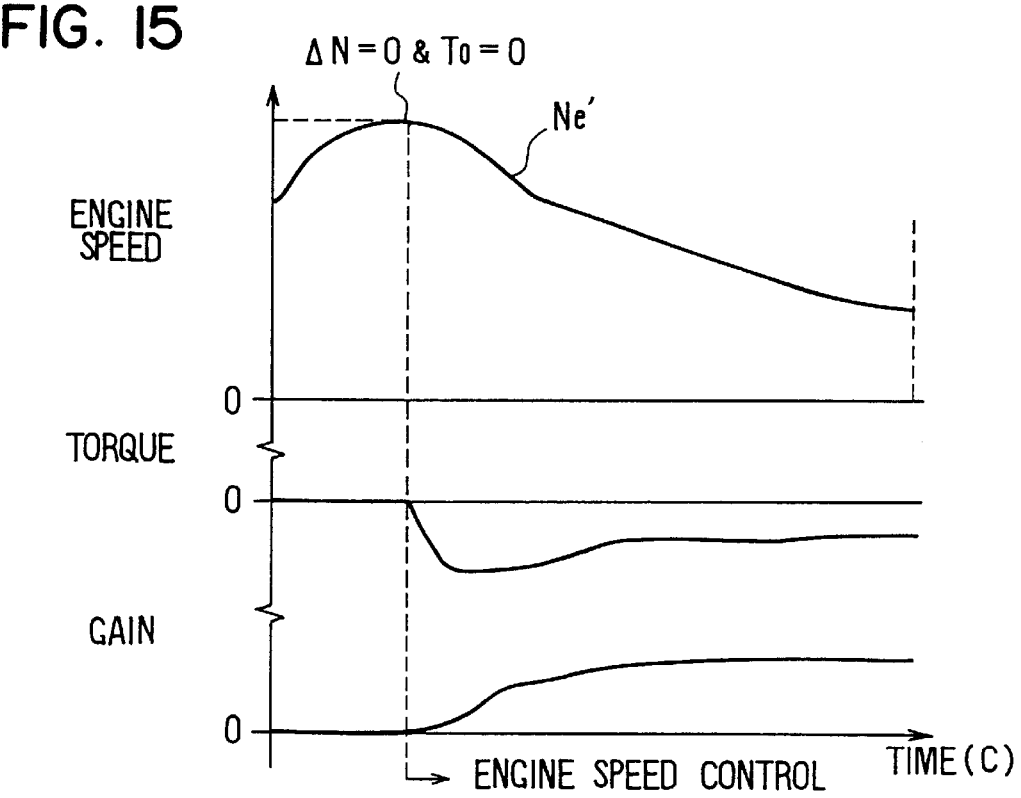
FIG. 15 is a timing diagram showing speed changes of the engine and torque changes of the first rotary electric machine in the other modification of the third embodiment.

That is, if it is in the transient period (YES at step S3200), the rotation speed demand value Ne is calculated normally at step S3203 in the same manner as at step S3202. Further, if it is at the start of the transient period (YES at step S3204), the gain G is set to zero at step S3205. If it is not at the start of the transient period (NO at step S3204), the gain G is calculated as a function of the counter value C at step S3207. Here, the mathematical function f(C) becomes zero initially and a fixed value Ge at the end of the transient period (C=Cm). The transient period Cm is calculated variably at step S3211 in the same manner as in the above modification shown in FIG. 13. According to this modification, the mechanical shock to the internal combustion engine 1 can be reduced in a manner shown in FIG. 15.

The present invention should not be limited to the above embodiments and modifications but may be implemented in other ways without departing from the spirit of the invention.

What is claimed is:

1. A control apparatus for a hybrid vehicle having an engine, a storage device and a power transmission device for transmitting power among the engine, the storage device and a vehicle drive shaft, the power transmission device including a first rotary electric machine for determining a rotation speed of the engine and a second rotary electric machine for generating a vehicle driving torque, the control apparatus comprising:

a control unit for controlling the power transmission device by determining an engine rotation speed demand value and an engine torque demand value based on required vehicle power and by determining a torque demand value for the first rotary electric machine in a direction to reduce a speed difference between an actual engine rotation speed and the engine rotation speed demand value based on a parameter related to a function of the speed difference and a control gain, wherein the control unit is for causing the first rotary electric machine to produce a vibration suppressing torque to be applied to the engine, the vibration suppressing torque being changing in opposite phase relation to a periodic change in an engine torque, and is for causing the second rotary electric machine to produce a torque in opposite phase relation to a vibration arising reactively from the vibration suppressing torque.

2. A control apparatus as in claim 1, wherein the control unit executes a vibration suppression control only when an operation point of the engine is within a region where the engine vibration caused by the periodic change in the engine torque is large.

3. A control apparatus for a hybrid vehicle having an engine, a storage device and a power transmission device for transmitting power among the engine, the storage device and a vehicle drive shaft, the power transmission device including a first rotary electric machine for determining a rotation speed of the engine and a second rotary electric machine for generating a vehicle driving torque, the control apparatus comprising:

a control unit for controlling the power transmission device by determining an engine rotation speed demand value and an engine torque demand value based on engine conditions and a vehicle speed and by determining a torque demand value for the first rotary electric machine in a direction to reduce a speed difference between an actual engine rotation speed and the engine rotation speed demand value based on a parameter related to a function of the speed difference and a control gain, wherein the control unit is for increasing the control gain when an operation point of the engine is within a region where an engine vibration caused by a periodic change in the engine torque is large.

4. A control apparatus as in claim 1, wherein the control unit is for causing the second rotary electric machine to produce a torque in opposite phase relation with a torque produced by the first rotary electric machine.

5. A control method for a hybrid vehicle having an engine, a first rotary electric machine coupled with the engine and a second rotary electric machine held rotatably with the first rotary electric machine and coupled with wheels, the control method comprising the steps of:

determining whether an operation point of the engine is within an engine idling region;

driving the engine at the operation point which is different from a highest operation efficiency point when the operation point of the engine is determined to be in the engine idling region;

driving the first rotary electric machine to produce a torque to reduce a periodic vibration of the engine when the operation point of the engine is determined to be in the engine idling region; and driving the second rotary electric machine to produce a torque in opposite phase relation with the torque of the first rotary electric machine when the operation point of the engine is determined to be in the engine idling region.

6. A control apparatus for a hybrid vehicle having an engine, a power transmission device including a rotary electric machine for producing a vehicle driving power from an output power of the engine, and a storage device, the power transmission device including a first rotary electric machine, which has a first rotor mechanically coupled with an input shaft of the power transmission device and a second rotor mechanically coupled with an output shaft of the power transmission device and electromagnetically coupled with the first rotor, and a second rotary electric machine operatively coupled with one of the first rotor and the second rotor, the control apparatus comprising:

a first rotor position detector for detecting a rotation position of the first rotor;

a second rotor position detector for detecting a rotation position of the second rotor; and a control unit for calculating a position difference between the detected rotation positions, for calculating a relative position relation between the first rotor and the second rotor from the calculated position difference and a time difference in timings of the rotation positions, and for controlling the first rotary electric machine based on the calculated relative position relation.

7. A control apparatus as in claim 6, wherein the control unit is further for calculating the time difference between actual detection timings of the rotation positions.

8. A control apparatus as in claim 6, wherein the control unit is further for storing the time difference as a fixed value.

9. A control apparatus as in claim 6, wherein the control unit is further for calculating a change in the relative position relation in a period of the time difference, and is for correcting the calculated relative position relation by the calculated change.

10. A control apparatus as in claim 6, wherein the control unit includes a first unit and a second unit for controlling the first rotary electric machine and the second control unit, respectively, the second unit is for receiving one of two signals of the first rotor position detector and the second rotor position detector and transmitting the same to the first unit, and the first unit is for receiving directly the other of the two signals of the position detectors.

11. A control apparatus for a hybrid vehicle having an engine, a storage device and a power transmission device for transmitting power among the engine, the storage device and a vehicle drive shaft, the power transmission device including a first rotary electric machine for determining a rotation speed of the engine and a second rotary electric machine for generating a vehicle driving torque, the control apparatus comprising:

a control unit for controlling the power transmission device by determining a torque demand value for the first rotary electric machine in a direction to reduce a speed difference between an actual engine rotation speed and an engine rotation speed demand value determined based on engine conditions and a vehicle speed, wherein the control unit is for varying at least one of the speed difference and a control gain.

12. A control apparatus as in claim 11, wherein the control unit is for setting the rotation speed demand value closely to the actual engine rotation speed when determining the torque demand value of the first rotary electric machine for the first time in a transient period, and for changing gradually the rotation speed demand value to a calculated value.

13. A control apparatus as in claim 12, wherein the control unit is for setting a coefficient, which is for calculating the torque demand value of the first rotary electric machine, closely to zero when determining the torque demand value of the first rotary electric machine for the first time in a transient period, and for changing gradually the coefficient to a calculated value.

14. A control apparatus as in claim 11, wherein the control unit is configured to start controlling the first rotary electric machine immediately after a complete combustion of a fuel-air mixture in the engine.

* * * * *